F. SPALDING.
SPEED INDICATOR.
APPLICATION FILED APR. 15, 1908.
951,491.
Patented Mar. 8, 1910.
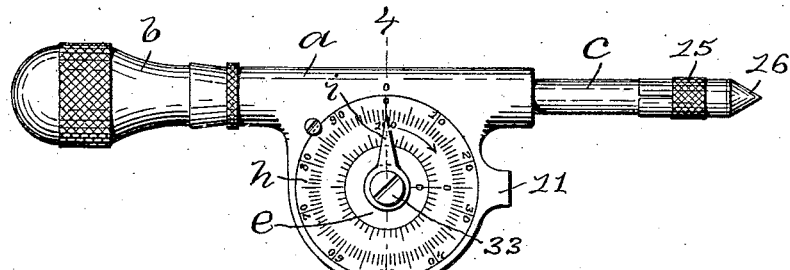
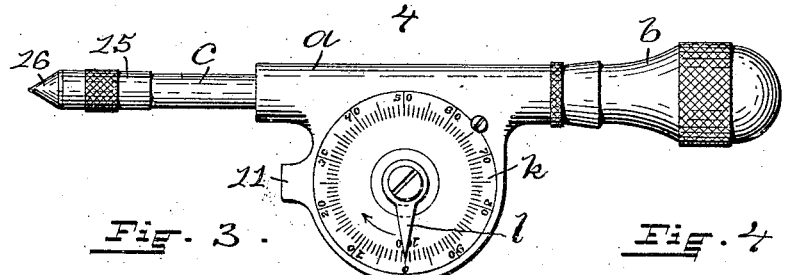
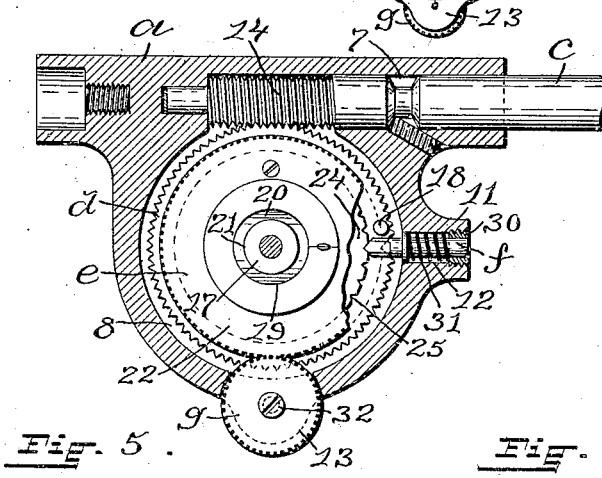
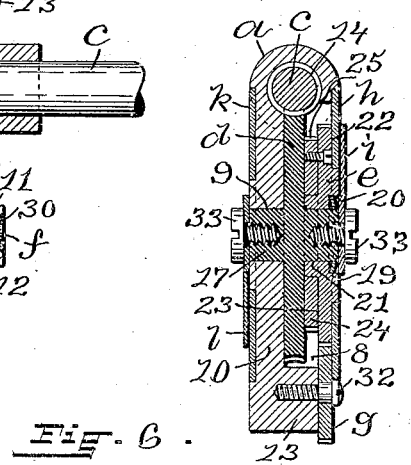
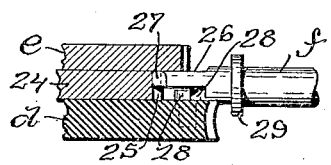
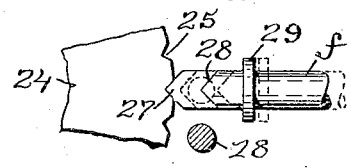
WITNESSES:
Ada E. Hagerty
J. W. Gibson
INVENTOR:
Frank Spalding
by Joseph A. Miller
ATTORNEY.

UNITED STATES PATENT OFFICE.

FRANK SPALDING, OF PROVIDENCE, RHODE ISLAND, ASSIGNOR TO BROWN & SHARPE MANUFACTURING COMPANY, OF PROVIDENCE, RHODE ISLAND.

SPEED-INDICATOR.

951,491.      Specification of Letters Patent.      Patented Mar. 8, 1910.

Application filed April 15, 1908. Serial No. 427,246.

*To all whom it may concern:*

Be it known that I, FRANK SPALDING, a citizen of the United States, residing at Providence, in the county of Providence and State of Rhode Island, have invented a new and useful Improvement in Speed-Indicators, of which the following is a specification.

This invention has reference to an improvement in instruments used for measuring or recording the speed of revolving shafts and more particularly to an improvement in speed indicators adapted to record the revolutions of a shaft from one to five thousand revolutions.

In speed indicators as heretofore constructed (having revolving indicating disks) the means for intermittently holding one of the disks, usually, consists of an external spring finger engaging with the notches in the disk. These spring fingers are liable to get bent or broken, thereby ruining the utility of the indicator, also the means used for turning back the disks are generally crude in construction and difficult to manipulate.

The object of my invention is to improve the construction of a speed indicator, whereby the means for intermittently holding the revolving indicating disks are protected from injury and strengthened in construction and the indicator provided with means for turning back the disk which can be easily and quickly manipulated by the operator.

My invention consists in the peculiar and novel construction of a speed indicator having an internal spring actuated latch for intermittently holding the revolving indicating disk, a protruding wheel engaging with the periphery of the indicating disk for setting back the disk, and other details of construction as will be more fully set forth hereinafter and claimed.

Figure 1 is a face view of my improved speed indicator. Fig. 2 is a back view of the speed indicator. Fig. 3 is an enlarged detail sectional view, showing the interior construction of the indicator looking toward the back. Fig. 4 is an enlarged transverse sectional view taken on line 4 4 of Fig. 1 through the indicator. Fig. 5 is an enlarged detail sectional view looking at the underside of the spring latch, and Fig. 6 is an enlarged detail view looking at the inner face of the spring latch.

In the drawings, $a$ indicates the frame, $b$ the handle, $c$ the spindle, $d$ the worm gear, $e$ the rotatable latch, $g$ the set-back wheel, $h$ the front fixed indicating disk, $i$ the rotatable front pointer, $k$ the back fixed indicating disk, and $l$ the rotatable back pointer of my improved speed indicator.

The frame $a$ has a longitudinal bore 7 for the spindle $c$ intersecting a circular recess 8 which extends in from the face of the frame and has a central hole 9 which extends through the back 10 of the frame for the hub of the worm gear $d$, a forwardly-extending boss 11 in which is a radial hole 12 for the latch $f$, and a downwardly-extending portion 13 recessed in the face for the set-back wheel $g$, as shown in Figs. 3 and 4.

The handle $b$ is secured to the rear end of the frame $a$ in the usual way or may be formed integral with the frame.

The spindle $c$ has the worm 14 on its inner end, a sleeve 15 having a pointed end 16 frictionally secured to its outer end and is rotatably secured in the bore 7 by a screw in the frame $a$ engaging with a circumferential groove in the spindle, as shown in Fig. 3.

The worm gear $d$ meshes with the worm 14 on the spindle $c$ and is in the form of a flat disk having a central hub 17 which extends equally on both sides of the gear and the length of which equals the thickness of the frame $a$. The rear end of the hub 17 is rotatably supported in the hole 9 in the back 10 of the frame $a$, as shown in Fig. 4. A stud 18 is secured to the face of the worm gear $d$ in a position to engage with the latch $f$, as shown in Figs. 3 and 5.

The rotatable indicating disk $e$ has a toothed or milled edge, a central circular cavity 19 for a spring washer 20 merging into a central hole 21 for the forward end of the worm gear hub 17, the outer circular stepped portion 22 for the front fixed indicating disk $h$ and the inner circular stepped portion 23. A disk 24 having a series of fifty V-shaped notches 25 in its periphery is secured to the inner face of the disk $e$, as shown in Fig. 4, or may be formed integral with the disk $e$.

The latch $f$ is in the form of a pin having a flattened face 26 adapted to engage with the inner face of the indicating disk $e$ and hold the latch from turning, a V-shaped inner end 27 adapted to engage with the V-shaped notches 25 in the periphery of the disk 24, a V-shaped shoulder 28 on the back, and a collar 29 adjacent the inner end of the latch. A screw-threaded ring 30 is screwed into the end of the boss 11 and a coiled spring 31 is placed on the latch intermediate the collar 29 on the latch and the ring 30, shown in Fig. 3.

The set-back wheel $g$ has a toothed or milled edge and is rotatably secured to the portion 13 of the frame $a$ by a screw 32 in a position for the edge on the periphery of the wheel to engage with the toothed or milled edge or periphery of the indicating disk $e$, as shown in Figs. 3 and 4.

The front fixed indicating disk $h$ has a central opening for the raised central portion of the disk $e$, and is recessed into the face of the frame $a$ flush with the surface of the frame where it is held by a screw or other means. This disk has inner and outer graduations on its face, as shown in Fig. 1.

The front pointer $i$ is secured to the front end of the worm gear hub 17 by a screw 33 which forces the pointer against the spring washer 20, thereby forcing the indicating disk $e$ into frictional contact with the worm gear $d$, as shown in Fig. 4.

The back fixed indicating disk $k$ has a central opening and is recessed into the back 10 of the frame flush with the surface of the frame, where it is held by a screw or other means. This disk has outer graduations on its face (as shown in Fig. 2) corresponding to the outer graduations on the disk $h$.

The back pointer $l$ is secured to the back end of the worm gear hub 17 by a screw 33, as shown in Fig. 4.

When in use the indicating disk $e$ is held normally from rotating by the V-shaped end 27 of the latch $f$ engaging with a V-shaped notch 25 in the disk 24, as shown in Fig. 6. The pointers revolve in the direction of the arrows, as shown in Figs. 1 and 2. When the worm gear $d$ completes one revolution the pointers have indicated one hundred revolutions of the spindle $c$. The stud 18 on the worm gear $d$ now engages with the V-shaped shoulder 28 on the latch $f$ and moves the latch outward against the tension of the spring 31, releasing the indicating disk $e$. The frictional contact of the worm gear $d$ on the disk $e$ moves the disk $e$ one notch or one-fiftieth of a revolution, when the stud 18 passing by the latch releases the latch and allows the same to engage with the next notch in the periphery of the disk 24. The reading is now one hundred revolutions of the spindle. As the spindle continues to revolve these operations are repeated, the latch $f$ acting to release and engage the disk $e$ for each one hundred revolutions of the spindle or until the spindle has revolved five thousand times, when the indicator will repeat. The indicating disk $e$ may be easily and quickly set back at any time by revolving the set-back wheel $g$ in either direction, the wheel being placed in a convenient position for the finger or thumb of the operator to engage with the toothed or milled edge of the wheel.

Having thus described my invention, I claim as new and desire to secure by Letters Patent:—

1. In a speed indicator, a spindle, a worm on the spindle, a worm gear meshing with the worm, an indicating disk, and means operatively connected with the indicating disk, whereby the indicating disk may be revolved by hand independent of the worm or worm gear.

2. In a speed indicator, a spindle, a worm on the spindle, a worm gear meshing with the worm, an indicating disk, means for holding the indicating disk in frictional contact with the worm gear, and a wheel operatively connected with the indicating disk, whereby the indicating disk may be revolved by hand independent of the worm gear.

3. In a speed indicator, a spindle, a worm on the spindle, a worm gear meshing with the worm, an indicating disk, means for holding the indicating disk in frictional contact with the worm gear, a disk having a series of notches in its periphery secured to the indicating disk, a spring actuated latch adapted to engage with the notches in the periphery of the disk, and means on the worm gear adapted to operate the spring latch, whereby an intermittent rotary movement is given to the indicating disk.

4. In a speed indicator, a frame, a spindle rotatably supported in the frame, a worm on the spindle, a worm gear meshing with the worm, an indicating disk having a milled edge, means for holding the indicating disk in frictional contact with the worm gear, a wheel having a milled edge rotatably secured to the frame in a position for the periphery of the wheel to engage with the periphery of the indicating disk, whereby the indicating disk may be revolved independent of the worm gear by turning the wheel.

5. In a speed indicator, a frame, a spindle rotatably supported in the frame, a worm on the spindle, a worm gear meshing with the worm, an indicating disk, means for holding the indicating disk in frictional contact with the worm gear, a disk having a series of V-shaped notches in its periphery secured to the indicating disk, a spring actuated latch reciprocally supported in the frame and having a V-shaped end adapted to engage with the V-shaped notches in the periphery of the disk, and a stud on the worm gear adapted to engage with the latch, whereby an intermittent rotary movement is given to the indicating disk.

6. In a speed indicator, a frame, a spindle rotatably supported in the frame, a worm on the spindle, a worm gear meshing with the worm, an indicating disk on the worm gear having a milled edge, means for holding the indicating disk in frictional contact with the worm gear, a disk having a series of notches in its periphery secured to or formed integral with the indicating disk, a spring actuated latch in the frame adapted to engage with the notches in the periphery of the disk, a stud on the worm gear adapted to engage with the latch, and a wheel having a milled edge rotatably secured to the frame in a position to extend beyond the frame and for the periphery of the wheel to engage with the periphery of the indicating disk, whereby an intermittent rotary movement is given to the indicating disk and the indicating disk may be rotated by the milled wheel.

7. In a speed indicator, a frame, a spindle rotatably secured in the frame, a worm on the spindle, a worm gear in the frame meshing with the worm, a hub on the worm gear rotatably supported in the back of the frame and extending from the back to the front of the frame, an indicating disk on the worm gear, means for holding the indicating disk in frictional contact with the worm gear, a disk having a series of notches in its periphery secured to the indicating disk, a spring actuated latch in the frame adapted to engage with the notches in the periphery of the disk, a stud on the worm gear adapted to engage with the latch, a wheel rotatably secured to the frame in a position for the periphery of the wheel to engage with the periphery of the indicating disk, fixed indicating disks on the front and back of the frame, and pointers secured to each end of the worm gear hub in a position to extend over the fixed indicating disks.

8. In a speed indicator, a spindle, a worm on the spindle, a worm gear meshing with the worm, a rotatable indicating disk, a front fixed indicating disk, a front pointer secured to the hub of the worm gear, a back fixed indicating disk, a back pointer secured to the back hub of the worm gear, and means operatively connected with the rotatable indicating disk, whereby the said disk may be revolved by hand independent of the worm or worm gear.

9. In a speed indicator, the combination of the following instrumentalities; a frame $a$, a handle $b$ on the frame, a spindle $c$ rotatably supported in the frame and having a worm 14, a worm gear $d$ in the frame meshing with the worm 14, a rotatable indicating disk $e$ on the worm gear, a disk 24 having a series of notches 25 25 in its periphery secured to the indicating disk $e$, means for holding the indicating disk $e$ in frictional contact with the worm gear $d$, a spring actuated latch $f$ reciprocally supported in the frame in a position to engage with the notches 25 25 in the periphery of the disk 24, a shoulder 28 on the latch, a stud 18 on the worm gear $d$ in a position to engage with the shoulder 28 on the latch, a set back wheel $g$ rotatably secured to the frame in a position for the periphery of the set back wheel $g$ to engage with the periphery of the indicating disk $e$, a front fixed indicating disk $h$, a front pointer $i$ secured to the hub of the worm gear $d$, a back fixed indicating disk $k$, and a back pointer $l$ secured to the hub of the worm gear $d$, as described.

In testimony whereof I have signed my name to this specification in the presence of two subscribing witnesses.

FRANK SPALDING.

Witnesses:
ADA E. HAGERTY,
J. A. MILLER.